LIVINGSTON & ADAMS.
Coffee Mill.
No. 1,795.  Patented Sept. 25, 1840.
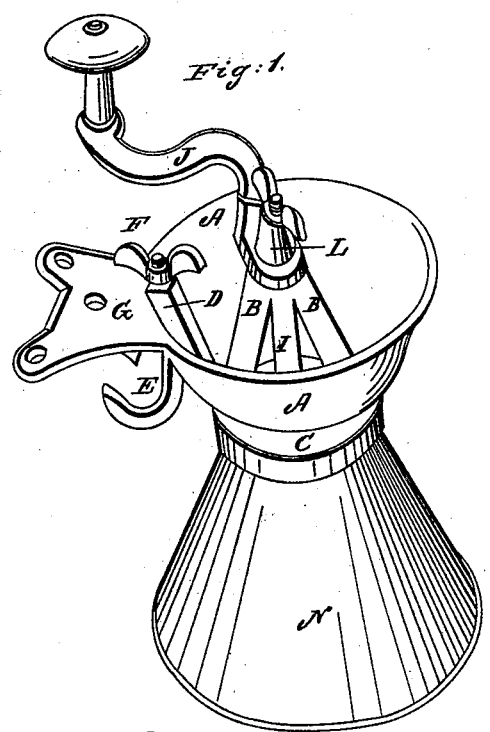
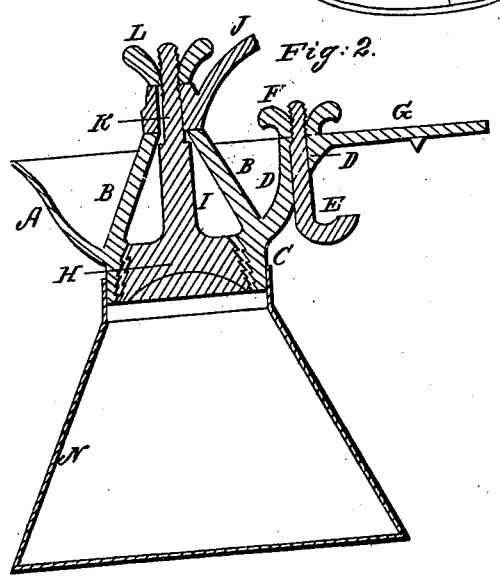
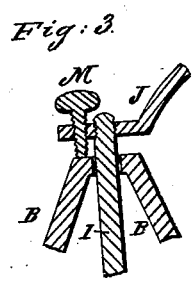

UNITED STATES PATENT OFFICE.

L. R. LIVINGSTON AND CALVIN ADAMS, OF PITTSBURGH, PENNSYLVANIA.

MANNER OF CONSTRUCTING MILLS FOR GRINDING COFFEE, &c.

Specification of Letters Patent No. 1,795, dated September 25, 1840.

*To all whom it may concern:*

Be it known that we, LAWRESTON R. LIVINGSTON and CALVIN ADAMS, of the city of Pittsburgh, in the State of Pennsylvania, have invented certain improvements in the manner of constructing metallic mills for the grinding of coffee and other articles to which such mills are adapted; and we do hereby declare that the following is a full and exact description thereof.

Our improvements consist, first, in a novel mode of forming the hopper, the shell within which the nut is to operate, and the arch pieces and collar by which the spindle of the nut is to be sustained, so that the whole of these parts are cast in one piece, by which arrangement simplicity and stability are both attained; secondly, in the manner in which we construct the part by which the mill is fastened to a table, or shelf; and, thirdly, in the manner in which we form the part for regulating the feed of the mill, by elevating, or lowering the nut.

In the accompanying drawing, Figure 1, is a perspective view of one of our mills; Fig. 2, a vertical section through the same, and Fig. 3, a sectional view of the winch, or handle, and of the manner of connecting it with the nut, and collar, of the arch pieces, so as to regulate the feed.

In each of these figures, like parts are represented by the same letters of reference.

A, A, is the hopper, which we usually make in the form of a cup, or bowl, as in many other mills constructed for the same purpose.

B, B, are arch pieces, or braces, of which there may be two, or three, rising from the edges of the opening in the bottom of the hopper, and connected at top, so as to form a collar within which the upper end of the spindle of the nut is sustained, and revolves.

C, C, is the shell within which the nut revolves, there being teeth, or grooves, on the interior of the shell, and on the exterior of the nut, formed and operating in the ordinary way, but in our mill, this shell, the hopper, arch pieces and collar, form one individual piece of casting.

For the purpose of fastening the mill to a table, or shelf, we so cast the hopper as to leave a tubular opening on one side of the hopper, as at D, D, which is to receive the shank of the hook E, furnished with a thumb screw F, at its upper end; we also cast a plate G, projecting out horizontally from the edge of the hopper, to bear upon the upper side of the table, or shelf, which is to be embraced between said plate and the hook E; there may be holes left in said plate for the reception of wood screws. It will be seen that by tightening the thumb screw F, the mill may be securely fastened.

In Fig. 2, H, is a section of the nut, and I, its spindle, passing through the collar at the top of the arch pieces. The winch, or handle, J, is shown as fitted on to a square at K; and as the lower end of this socket rests on the collar of the arch pieces, it will be manifest that the nut may be raised, or lowered, by means of the nut, or thumb screw, L. When casting the nut H, we insert a piece of malleable iron within its spindle I, upon which the screw at its upper end is to be formed.

Fig. 3, represents another modification of the manner of regulating the nut by means of a screw acting upon the face of the collar of the spindle. In this modification, the handle J, is made to screw on to the upper end of the spindle, and a regulating, or thumb, screw M, is tapped through the head of the handle, so as that its lower end may bear upon the face of the collar; it will be seen that the effect of turning this screw will be the same with that of turning the screw, or nut, L, in Fig. 2. Instead of a square on the spindle, Fig. 2, the handle may be fitted to the spindle by means of a slot and feather.

N, is a tin receiver which may slip on to the outside of the shell C, C, which is made somewhat conical; this receiver furnishes a neat and convenient receptacle for the article ground.

Having thus fully described the manner in which we construct our mill for grinding coffee, and other articles, what we claim therein as constituting our invention, is—

1. The manner of combining the hopper, the shell, and the arch pieces and collar, as herein set forth, so as to form the whole in one piece of casting.

2. The manner of fastening the mill to a table, or shelf, by means of the hook and nut, and the projecting plate, cast with the hopper, as described.

3. The manner of regulating the nut so as to grind either coarse, or fine, by means of a screw and nut regulating the bearing of the socket of the handle upon the face of the collar; or by means of a screw passing through the head of said handle, and bearing upon the collar, substantially in the manner herein set forth.

L. R. LIVINGSTON.
     CALVIN ADAMS.

Witnesses:
 ALEX. MILLAR,
 I. I. ROGGEN.